Nov. 17, 1931.  W. HOOS  1,832,395

BINDER TWINE BOX

Filed Feb. 16, 1928   2 Sheets-Sheet 1

INVENTOR
WILLEM HOOS
By
ATTORNEY

Nov. 17, 1931.   W. HOOS   1,832,395
BINDER TWINE BOX
Filed Feb. 16, 1928   2 Sheets-Sheet 2

INVENTOR
WILLEM HOOS
By
ATTORNEY

Patented Nov. 17, 1931

1,832,395

UNITED STATES PATENT OFFICE

WILLEM HOOS, OF WASSENAAR, NETHERLANDS

BINDER-TWINE BOX

Application filed February 16, 1928. Serial No. 254,813.

This invention relates to binder-twine boxes as fitted to harvesting machines such as mowing machines, threshing machines and the like. Such a box is ordinarily adapted to contain two binder-twine balls placed the one upon the other and is provided with a cover having a central hole through which the twine wound off from the upper ball is passed to the binding mechanism proper.

It is known that such balls come into the market in a coreless condition and are wound off from the inside, i. e. the leading end of the twine lies more or less freely in the central hole of the ball, whereas the other end is knotted to the body portion at the circumference of the ball.

Now, as far as I am aware, the general practice is to connect the leading end of the lower ball to the outer end of the upper ball before putting the balls into their box, so that the lower ball begins to unwind immediately after the upper one has been completely unwound. After a certain time the attendant removes the already partly unwound lower ball from the box, knots the outer end thereof to the inner end of a fresh ball and reinserts both balls into the box, having care that the fresh ball be placed on the bottom. And so on.

In practice the inconvenience is experienced that when the upper ball has almost entirely been wound off, the thin cylindrical outer layer to which it has then been reduced tends to collapse and is liable to get entangled and be lifted and tightly drawn against the cover by the twine running to the binding mechanism. The tension thus set up may cause the twine to break, when the attendant has to knot the ends together and again rove the twine through the binding mechanism, which, as will be understood, is troublesome and causes considerable loss of time.

The object of my present invention is to avoid this inconvenience and with this object in view I suggest to provide the box with means adapted to exert a resilient pressure externally on a ball placed therein so as to keep it in the proper shape when unwinding, to counteract its tendency to be pulled up by the tension occasioned by the binder, and also to prevent the ball from collapsing and/or entangling.

In order that my invention may be well understood, I shall now proceed to describe the same with reference to the annexed drawings, which illustrate some embodiments thereof and on which:

Figure 1:
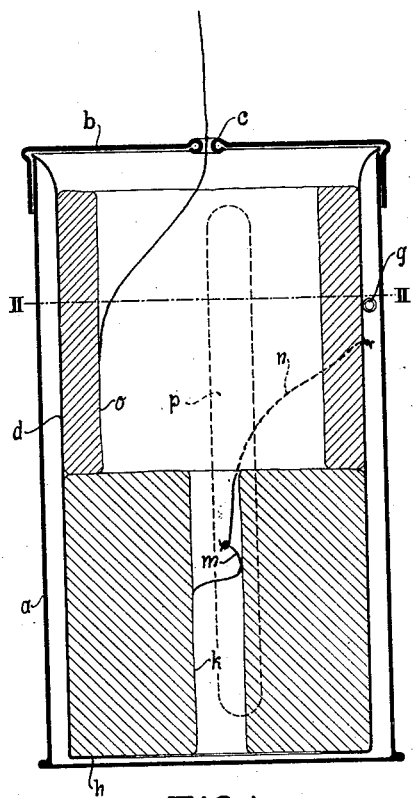
Fig. 1 is a vertical section of one embodiment of my invention.

Referring to Fig. 1, $a$ is the box, which may be of the ordinary cylindrical shape, and $b$ is the cover provided in its central portion with an eye $c$.

Loosely mounted within box $a$ is a shell $d$ composed of two semi-cylindrical thin sheet-iron flaps $e$ hinged together as at $f$. A coiled spring $g$ having its ends attached to either of the flaps $e$ in the upper portion thereof, tends to close the shell.

The bottom $h$ of shell $d$ has a relatively large central opening $i$ and placed on said bottom, within shell $d$, is a binder-twine ball $k$ having its inner or leading end $m$ knotted to the outer end $n$ of a second ball $o$ placed on ball $k$. The twine of ball $o$ is unwound from the inside and runs through the eye $c$ to the binder, not shown.

The flaps $e$ are so dimensioned that, when the balls are in their proper places, there is a gap between the free edges of the flaps $e$ which, consequently, exert a certain amount of external radial pressure on the balls, the pressure on the upper ball exceeding that on the lower ball owing to the spring $g$ engaging the upper portion of the flaps. This pressure will prevent the upper ball from collapsing and from being drawn against the cover $b$, when said ball has for the greater part been unwound.

When ball $o$ has been completely wound off, box $a$ is uncovered and shell $d$ containing ball $k$ removed therefrom. Thereafter, ball $k$ is removed from the shell and its outer end knotted to the leading end of a fresh ball, whereupon both balls are reinserted into the shell, the fresh ball down, the shell again placed into the box $a$ and the cover $b$ put in place.

In order that the ball or balls within the shell $d$ may easily be removed therefrom, the latter may be provided with one or more longitudinal slots $p$, through which the attendant can insert his fingers to engage the balls and push them axially out of the shell.

Figure 3:
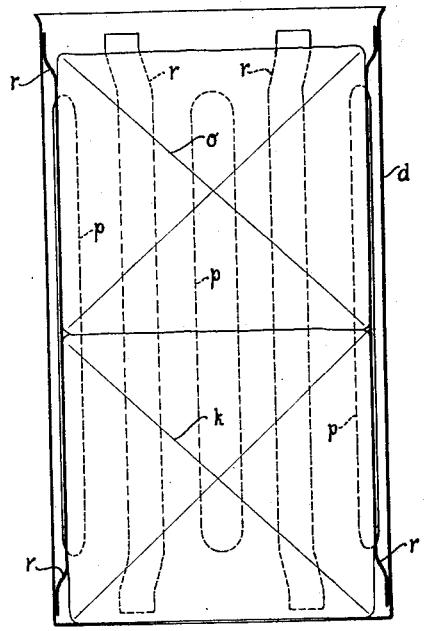
Fig. 3 is a vertical sectional view of a second embodiment.

In Fig. 3, which illustrates another embodiment of my invention, box $a$ has not been shown. According to this figure, a plurality of equally spaced spring blades $r$ parallel to the axis are secured at either end to the inner wall of shell $d$, the radial distance between two diametrically opposed blades normally being slightly smaller than the outer diameter of a ball. Also in this case the spring blades $r$ may be so arranged as to exert a greater amount of pressure on the upper ball than on the lower ball.

Figure 4:
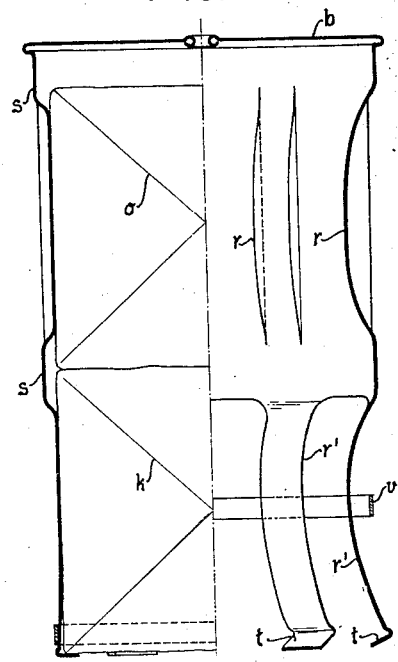
Fig. 4 is a vertical sectional view of a third embodiment.

According to Fig. 4, in which box $a$ has also been omitted, the cover $b$ is provided with a cylindrical extension $s$, which now performs the function of the loose shell $d$ in the embodiments described above. The axial length of the extension $s$ is almost equal to that of the box $a$, into which it is to be placed. Its upper half is provided with a plurality of axial, inwardly curved spring blades $r$ cut out of the material and the lower half has a plurality of long, axial recesses forming between them a plurality of inwardly curved spring blades $r'$ having offset lower portions $t$, locking ring $v$ being slipped over said blades $r'$. If the upper ball $o$ placed within this cover has been entirely wound off, it is not necessary to remove the lower ball $k$ from the cover, but the same can simply be pushed into the upper portion of the cover, after its outer end has been knotted to the leading or inner end of a fresh ball, which is then inserted into the cover from below, ring $v$ assuming its central position. Thereafter, ring $v$ is slipped downward over springs $r'$, whereby the clutches $t$ of these springs are pressed inward so as to lock ball $k$.

Figure 2:
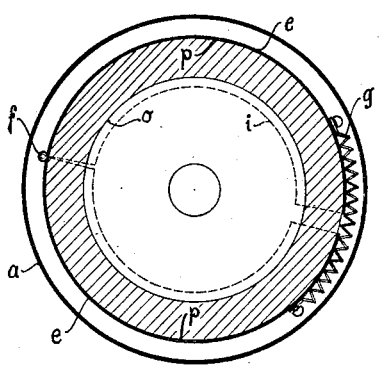
Fig. 2 is a horizontal sectional view along the line II—II in Fig. 1.
Figure 5:
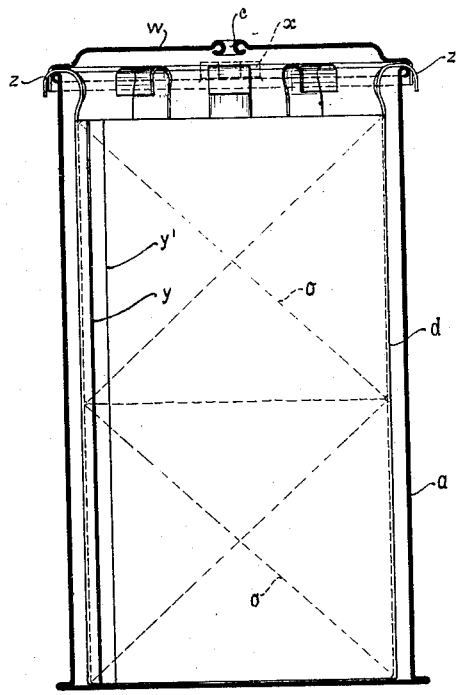
Fig. 5 is a vertical sectional view.
Figure 6:
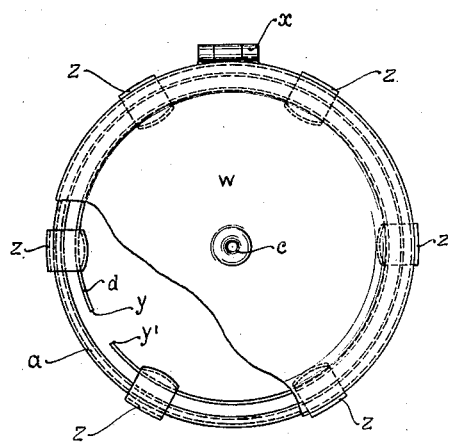
Fig. 6 is a plan view of a fourth embodiment.

In Figs. 5 and 6, the box $a$ has a lid $w$ hinged thereto as at $x$ and is provided with an eye $c$. The shell $d$ is formed by a thin sheet of resilient metal bent into a cylindrical shape, a certain gap being left between the axial edges $y$, $y'$. Along its top edge, the shell $d$ is provided with six hooks $z$, formed by lips stamped from the sheet and having an inward curve in addition to an outwardly bulged horizontal section, so that they can serve to guide the binder twine-balls to be inserted into the shell. The shell $d$ is suspended by its hooks $z$ from the top edge of the box $a$. This embodiment has the advantage that the outer diameter of the shell needs hardly be smaller than the inner diameter of the box, although the shell is provided with efficient guiding means for the twine-balls. In Figs. 1 and 2, the flared upper portion of the shell must be accommodated within box $a$, that is to say, there must be a certain clearance between the cylindrical portion of the shell and the box, so that the latter must be wider than normal in order to receive twine-balls of normal size.

What I claim is:—

1. In combination, a substantially cylindrical box adapted to contain a binder-twine ball, and a loose split shell of resilient metal placed inside said box and bent into a cylindrical shape, so as to tend to exert external radial pressure upon a ball placed in the shell, said shell being provided along its top edge with a plurality of hooks adapted to engage the top edge of the box.

2. In combination, a substantially cylindrical box adapted to contain a binder-twine ball, and a loose split shell of resilient metal placed inside said box and bent into a cylindrical shape, so as to tend to exert external radial pressure upon a ball placed in the shell, said shell being provided along its top edge with a plurality of inwardly curved and in horizontal section bulged hooks adapted to engage the top edge of the box.

In testimony whereof I affix my signature.

WILLEM HOOS.